(12) United States Patent
Sakai et al.

(10) Patent No.: US 6,365,662 B1
(45) Date of Patent: Apr. 2, 2002

(54) NON-SLIP ARTIFICIAL STONE

(75) Inventors: Mieko Sakai, Tokyo; Kenichiro Saito, Chiba, both of (JP)

(73) Assignee: Doppel Co., Ltd., Tokyo (JP)

( * ) Notice: Subject to any disclaimer, the term of this patent is extended or adjusted under 35 U.S.C. 154(b) by 0 days.

(21) Appl. No.: 09/600,409

(22) PCT Filed: Jan. 16, 1998

(86) PCT No.: PCT/JP98/00144

§ 371 Date: Sep. 11, 2000

§ 102(e) Date: Sep. 11, 2000

(87) PCT Pub. No.: WO99/36371

PCT Pub. Date: Jul. 22, 1999

(51) Int. Cl.$^7$ .................................................. C08J 5/01
(52) U.S. Cl. ........................ 524/494; 524/449; 523/223
(58) Field of Search .......................... 523/223; 524/494, 524/449

(56) References Cited

FOREIGN PATENT DOCUMENTS

| JP | 100816 | * | 6/1994 |
| JP | 06157102 | * | 6/1994 |

* cited by examiner

*Primary Examiner*—Kriellion A. Sanders
(74) *Attorney, Agent, or Firm*—Wenderoth, Lind & Ponack, L.L.P.

(57) ABSTRACT

A non-slip artificial stone excellent in walking safety and disaster prevention is provided, which is characterized in that an inorganic particle component comprises 82 to 93 weight percent and a resin component comprises 7 to 18 weight percent of the total weight of the product and the proportion of a resin-exposed surface area to a unit surface area of 50 mm in length×50 mm in width is from 15 percent or more to 40 percent or less.

15 Claims, 2 Drawing Sheets

NON-SLIP ARTIFICIAL STONE

This application is a 371 of PCT/JP98/00144 filed Jan. 16, 1998.

FIELD OF THE INVENTION

The present invention relates to a non-slip artificial stone. More specifically, the invention relates to a lightweight, high-hardness, high-strength, and high-density artificial stone which has the granite-like or marble-like excellent sense of touch, excellent characteristics such as good surface hardness and surface resistance to friction and in addition, non-slip properties that one can walk on the surface of the stone without slipping (sliding). The invention provides a non-slip artificial stone useful as building materials for flooring, bathrooms, toilet rooms, kitchens, and other uses and members for public facilities for the passages of underground markets, staircases, and the platforms of railroads.

BACKGROUND ART

The preparation of artificial stones has hitherto been known wherein natural stones are pulverized into appropriated sizes, blended with calcium carbonate and resins, and then cured.

For such artificial stones, efforts are made to realize massive granite-like or marble-like surfaces with transparency and depth by improvement in composition or process for the preparation of the stones.

On the other hand, the studies of improvement in functions of the artificial stones also are carried out together with attempts for the aforesaid improvement.

In almost all of conventional artificial stones, however, artificial stones that have the marble-like massive depth on the surfaces and also the transparency as well and are sufficient in strength, hardness and endurance as stone materials have not yet been realized. Furthermore, the improvement in functions is quite a future problem.

Under these circumstances, the present inventors have developed an artificial stone that is substantially different from the conventional artificial stones in composition and physical properties and novel in color tones and physical properties in spite of very small amounts of resin blended. The inventors have made efforts to provide further novel functions to the artificial stone and to enlarge the uses thereof.

In the course of this investigation, the inventors have found that as well as artificial stones whose surfaces are polished in the condition of a mirror plane, artificial stones having non-slip properties where one can walk on the surfaces without slipping (sliding) also are important from the viewpoint of the function and uses thereof.

The reason for this is that in the flooring of buildings, the flooring of bathrooms, the staircases and passages in buildings or streets, the platforms of railroads, the flooring or public facilities, less slipperiness of the surfaces thereof is an important function and an indispensable problem from the viewpoint of safety and disaster prevention. In the artificial stones, furthermore, the non-slip properties thereof have hardly been investigated in fact.

Accordingly, the inventors have intensively studied to realize an artificial stone which meets requirements for strength or hardness in flooring, staircases, passages, streets, platforms or railroads, and floor of public facilities, presents a view finer than natural stone materials and in addition, has the non-slip properties as described above.

Under the aforesaid circumstances, the invention aims at providing a novel artificial stone that has a tight structure as products, transparency and depth, marble-like excellent color tone, large strength and hardness, good molding properties, and also non-slip properties.

SUMMARY OF THE INVENTION

For solving these problems, the invention provides a high-density artificial stone having non-slip properties, which is characterized in that an inorganic particle component comprises 82 to 93 weight percent and a resin component comprises 7 to 18 percent of the total weight of the product and that the proportion of a resin-exposed area to a unit surface area of 50 mm in length×50 mm in width is from 15 percent or more to 40 percent or less.

In addition, the invention also provides a non-slip artificial stone characterized in that the surface roughness of the aforesaid artificial stone is from 0.05 to 2 mm or more on the average.

Furthermore, the invention also provides a process for preparing the respective artificial stones as described above.

DETAILED DESCRIPTION OF THE INVENTION

Description of the Preferred Embodiments

Figure 1:
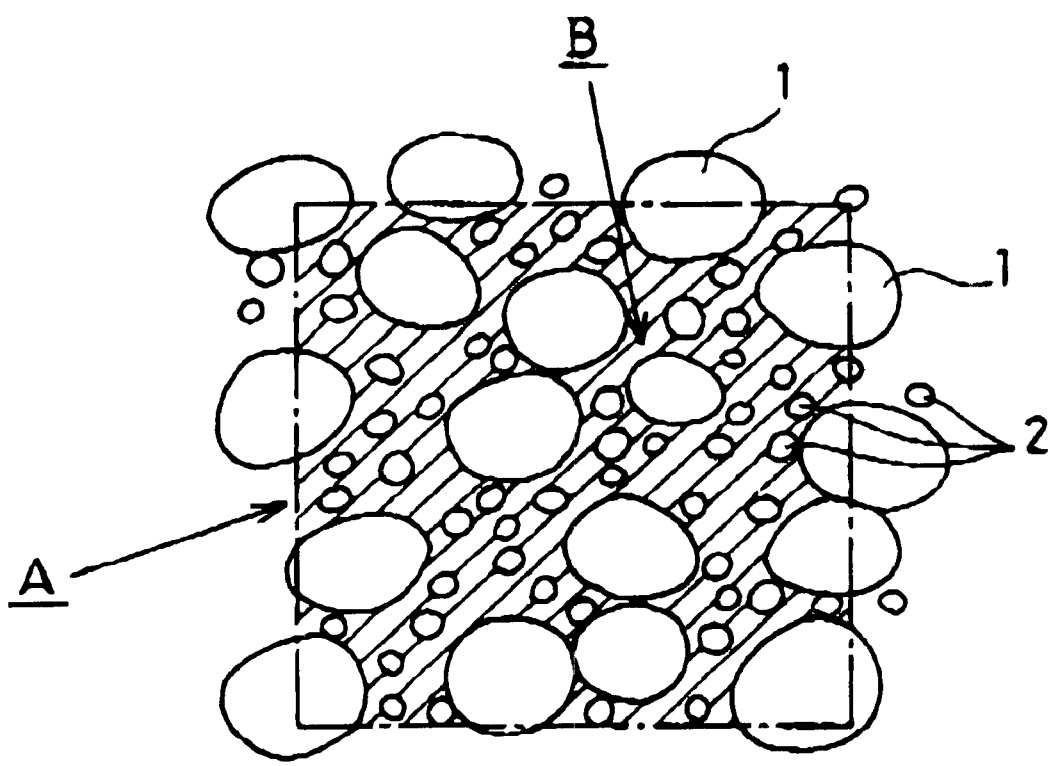
FIG. 1 and FIG. 2 are schematic views of the plane and the section of an artificial stone, respectively.

The invention is hereinafter illustrated in further detail.

First, about the non-strip stone of the invention, the following are fundamentally considered from the standpoint of its composition, (1) Inorganic particle component:

The component comprises 82 to 93 weight percent of the total amount of the product. This component in practice is constituted of an inorganic small particle component of 5 to 70 meshes (Tayler level) and an inorganic fine particle component of 100 meshes or less (Tayler level).

(2) Resin Component:

The component comprises 7 to 18 weight percent of the total amount of the product.

(3) Components blended in small amounts:

The components include stabilizers, colorants, curing agents, and the like.

The inorganic particle component (1) is further illustrated. Examples of the inorganic small particle component of 5 to 70-mesh sizes as described above include minerals such as silica, peridot, feldspar and mica; natural stones such as granite and metamorphic rocks; and ceramics, glass and metals.

In the preparation of artificial stones, the color tone or decorative design thereof is an important matter. The artificial stones set the goal at granite or marble because the products from these natural stones have beautiful color and gloss, but are difficult to obtain. In this case, the color and gloss are an important theme to determine the value of granite and marble. Natural granite and marble assume a variety of colors such as black, white, or red and in addition, have different degrees in tint of one color.

When various artificial stones are colored, for example, for a black artificial stone, only black particles of a natural stone are used so far. For an intermediate color tone, however, the reproducibility is a serious problem. In addition, the unique gloss of marble is difficult to provide to an artificial stone even when the stone can be colored with good reproducibility.

For example, even when artificial stones are colored by use of dyes or pigments, the gloss and the depth are difficult to provide to the artificial stones.

In the invention, however, transparent particles can be used as the small particle component. For example, in order to obtain granite-like or marble-like glossy artificial stones, small particles prepared by pulverizing a quartz-series natural stone can be used as the small particle component.

The small particles prepared by pulverizing the quartz-series natural stone have unique smooth areas at the surfaces because the starting material is of quartz-series and are colorless and transparent in many cases. Even when the particles are tinged with a color, the color is not so deep and when the particles are not transparent, most particles leave some transparency.

Use of this starting material makes it possible to control the color of the resulting product. In addition, the color can provide the depth and gloss to the product by the presence of the transparent quartz-series small particle component.

The fine particle component under 100 meshes can be appropriately used together with the aforesaid small article component. The fine particle component includes a variety of natural or artificial fine particle components. For example, calcium carbonate, water and aluminum hydroxide are easily available fine particle components.

Components such as manganese dioxide, titanium dioxide, zirconium silicate, or iron oxide for controlling the color tone and light build-up agents such as strontium aluminate or inorganic fluorescent materials of various oxides for providing a function of luminescence or fluorescence can be blended as part of the fine particle component. For fire retardance, components such as antimony trioxide, boron compounds, or bromine compounds can be blended.

The aforesaid resin component (2) can be selected from among a wide variety of thermosetting ones.

For example, acrylic resins, methacrylic resins, unsaturated polyester resins, and epoxy resins are exemplified. Of these, methacrylic resins, epoxy resins, mixtures thereof, and copolymerized resins thereof are preferred.

Azo-series or phthalocyanine-series organic pigments or dyes can be added beforehand to the resin component as the aforesaid component (3).

The inorganic small particle component such as the aforesaid natural stones functions as a principal factor to determine appearance and physical properties of the resulting artificial stone. Particularly, partial exposure thereof exerts the effect on the apparent color and pattern and non-slip properties of the surface as a principal factor in corporation with other components.

The inorganic fine particle component is considerably smaller than 100-mesh level as compared with the small particle component. The fine particles invade among the small particles and are positioned so as to fill the voids of the particles, which contributes to the hardness or flexibility and the surface non-slip properties of the resulting artificial stones. The inorganic small particle component and the inorganic fine particle component are generally from 0.5:1 to 5:1 and preferably from 1:1 to 4:1 in weight ratio.

The resin component envelops the small particle component and the fine particle component of natural stones that form the aforesaid skeleton to contribute to binding the whole of the artificial stone and also to have a function of providing elasticity or tensile strength to the resulting product of artificial stone. In addition, the proportion of the resin component decides the extent of the non-slip properties of the surface of the artificial stone as well as the strength and hardness thereof.

In the invention, accordingly, the contents of the respective aforesaid components are important. One of the characteristics of the invention is to provide rigid, high-density products of a tight structure. The rigid, high-density herein means that both the small particle component and the fine particle component as the inorganic particle component contained in an artificial stone product are present with high density. The degree of the density is, for example, 2.2 grams/cm$^3$ or higher, which exceeds the range of the conventional artificial stones.

That is, as the content of the small particles of natural stones which are a skeleton component increases in a product, the artificial stone becomes close to the natural stone. A too much amount of small particles however fail to harden and it is impossible to use as a product. The physical properties of the resulting product are so poor that the product cannot endure usual uses.

A too much amount of the fine particle component also unpreferably fails to harden. The resulting product has no gloss to the extent that it cannot be termed a stone.

From the viewpoint of the non-slip properties at which the invention aims, the proportion of the inorganic particle component to the resin component is to fall in an appropriate range.

Accordingly, the proportion in amount of the small particle component or the fine particle component is limited. The content of the inorganic particle component as the sum of both particle components must comprise 82 percent or more and preferably 85 percent or more of the entire product in weight ratio. Exceeding 93 percent results in forming fragile products that are difficult to use and also fail to acquire the non-slip properties. The content not reaching 82 percent causes too soft products to yield and fails to provide qualities as stones wherein the range of uses is similar to that of resin plates. Suitable non-slip properties also are not obtained. Therefore, the contents is preferably from 85 to 92 percent and more preferably from 88 to 91 percent.

This means that other materials than the small particle component and the fine particle component of natural stones, that is, the resin component cannot exceed at most 18 percent of the product in weight ratio.

The resin component exceeding 18 percent leads to products of plastic properties, which are nominal artificial stones of only deceptive appearance. On the other hand, a too small amount of resin component leads to fragile products that cannot be used, although the products come to have appearances close to natural colors. The non-slip properties also are difficult to acquire. From this viewpoint, the content of resin component is adjusted preferably to from 8 to 15 weight percent and further preferably to from 9 to 12 weight percent.

In the artificial stone compositions of the invention and the artificial stones as the resulting products, some or all of the aforesaid inorganic small particle component are transparent particles and the particles or small lumps may be covered with inorganic or organic substances beforehand.

Such covering of the transparent inorganic small particle component is carried out by covering the surfaces thereof with resins and then curing or by baking an inorganic substance such as water glass or glazes for ceramic ware and covering. In either case, the surfaces of the transparent small particle component can be covered in thickness of several $\mu$m to several tens $\mu$m, for example, of 5 to 50 $\mu$m and preferably of 20 to 30 $\mu$m. More concretely, for example, an acrylic resin or unsaturated polyester resin composition is used and heated to about 150 to about 300° C. or irradiated with light to cover the particle surfaces of the small particle component with these resin compositions. Or covering with the inorganic substances is carried out by baking water glass or glazes at a high temperature of 800 to 1100° C.

The color of the products can be controlled by the color tone of covering layers of the small particle component and the resin compositions and in addition, can be tinged with the depth and gloss by the presence of transparent quartz-series small particle component.

For example, when a covering layer is a baking layer of water glass containing a white pigment or when a covering layer is a cured layer of a polyester unsaturated resin and furthermore, a polyester unsaturated resin is used as the resin component, the resulting products assume a glossy milky color and the products have a color tone very close to natural milky-colored marble, since the color of the resin is white of a somewhat yellow tint in general.

Covering layers containing colorants such as pigments or dyes can assume as unique color tone with the depth and gloss.

In the invention, joint use of colored particles of sizes similar to particle sizes of the small particle component as a colorant component also permits coloring of the products.

At all events, artificial stones that can very easily secure the reproducibility of color, cause no discoloration, and possess excellent depth and gloss are obtained as compared with the conventional artificial stones.

In the artificial stones of the invention, it is particularly effective to coat particles of the natural transparent small particle component with a glaze for coloring ceramics ware, to bake the glaze to make the particles of desired color, and to use the particles as the small particle component. This process makes it possible to select color surely and widely.

When the same small particle component prepared by pulverizing a quartz-series natural stone as those used as the small particle component which has been coated with a glaze and undergone baking is used, the reproducibility of colors such as black or red causes quite no problem and all gloss and color tone also are completely reproduced as well as the color reproduced.

This covering permits great improvement in affinity to the entire structure of the small particle component that functions as an aggregate of artificial stones. Furthermore, mixing of the fine particle component with a resin component brings about large strength and satisfactory hardness of surfaces.

More importantly, the abrasion of the surfaces of the artificial stone products causes the covering layer to break partially because the transparent natural stone as described above is used as the small particle component and the surface has been subjected to rigid covering. Superficial structure of partially exposed particles of the inorganic transparent small particle component and the peripheral covering layer comes to provide a unique effect in reflection of light.

That is, light incident on the transparent small particle component is reflected by the peripheral covering layer, passes through the transparent small particle component again, and reflected. The phenomenon of these passing light and reflecting light is substantially different from that of light reflected only by the surface of conventional artificial stones, which provides a unique feeling of depth to the artificial stone products of the invention. Dignified, deep, and high-quality marble-like artificial stones are thus obtained.

The transparent small particle component having the covering layer as described above can comprise in general 10 to 100 percent of the total amount of the inorganic small particle component blended to the compositions.

In the invention, it is suitable that the inorganic small particle component has sizes of 5 to 70 meshes. However, use of particles having an almost uniform size is generally preferred except special cases. When an artificial stone having different tints in the upper part or the lower part of the stone are demanded, use of colored particles and colorless particles different in size is expected to be effective. However, massive use of two kinds of particles extremely different in size unpreferably causes deterioration in strength of the products.

On the other hand, it is suitable that the particle size of the inorganic fine particle component is under 100 meshes, but the particles need to invade sufficiently among particles of the small particle component. Accordingly, particles of the fine particle component close in size to particles of the small particle component are unpreferred and more concretely, the suitable particle size of the fine particle component is from 150 to 325 meshes.

It is further important to the high-density artificial stones that the composition of these materials is uniform in all portions except special cases.

A short fiber component can be blended to reinforce the structure in equilibrium with the color tone. For example, glass fiber, ceramic fiber, metallic fiber, or resin fiber can be used. Above all, the glass fiber is exemplified as preferred fiber.

The short fibers of 10 to 100 $\mu$m in diameter and about 1 to about 10 mm in length are used in proportion of about 1 to about 10 weight percent to the small particle component.

Subsequently, an indispensable point to the non-slip artificial stones of the invention is illustrated. The proportion in area of a resin-exposed surface to the surface of an artificial stone is important as well as the proportion in content of the inorganic particle component to the resin component as described above.

Figure 2:
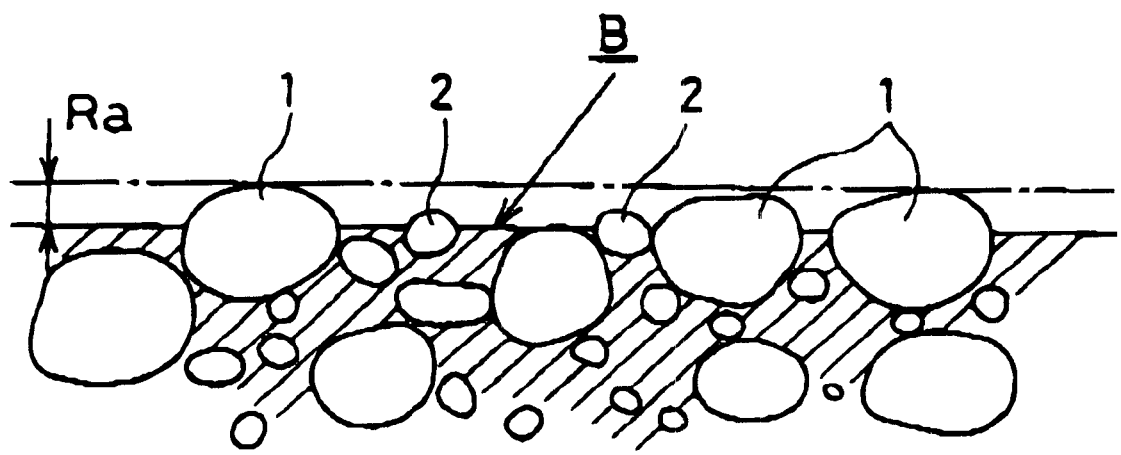

That is, for example, the plane of the artificial stone is schematically shown in FIG. 1 and the section thereof is similarly shown in FIG. 2. This invention prescribes that the proportion of a resin-exposed plane area (B) to a unit surface area of 50 mm in length×50 mm in width (plane region A in FIG. 1) is from 15 percent or more to 40 percent or less. The proportion is more preferably 35 percent or less, and most preferably 30 percent or less. The proportion is more suitably from 20 to 35 percent and most suitably from 25 to 30 percent. That is, the proportion of the resin-exposed plane area (B) to the sum of exposed areas of the small particle component (1) and the fine particle component (2) of the inorganic particle component is from 15 percent or more to 40 percent or less.

The proportion not reaching 15 percent or exceeding 40 percent fails to produce good non-slip properties. In the proportion less than 15 percent, rigid, inorganic particle component comprises a large proportion in plane and therefore, enhancement in surface roughness makes it possible to acquire the non-slip properties, but tends to cause a stumble or a larger slip on walking. On the other hand, exceeding 40 percent where the resin surface comprises a large proportion often causes slipping rather because of wetting properties and dirt retention.

Accordingly, the point of the invention is that the proportion is from 15 percent or more to 40 percent or less.

In addition, the invention also prescribes that the suitable average surface roughness (Ra) is from 0.05 to 2 mm as shown also in FIG. 2.

The proportion of plane areas and the surface roughness as described above are to be controlled by the aforesaid proportion of the composition and a surface treatment relating to the molding of artificial stones.

The molding is carried out according to a variety of embodiments including casting and compression molding.

For example, in the compression molding, a material (mixed material) prepared by blending and kneading a small particle component, a fine particle component, and a resin component beforehand in the respective amounts necessary for the composition after achieving molding are placed in a bottom die as a horizontal frame, a top die is fitted into the bottom die, and the compression molding is carried out by applying a surface pressure of 5 to 100 kgf/cm$^2$. In this molding, a temperature of about 90 to about 140° C. is applied for about 5 to about 20 minutes during compression.

In addition, in the compression molding while heating, vibration can be applied to the frame together with pressure to maintain good fluidity of the aforesaid mixed material in the frame.

It is a matter of course that the non-slip artificial stones of the invention are not limited to flat plates in form as practical products. Forms having guiding projections for visually handicapped persons or projections on the surfaces, forms having differences in level and various other forms are expected.

From the viewpoint of prevention of disasters, a guiding signal can also be naturally made by use of light build-up agents for guidance in the dark as a component for the artificial stones of the invention. This method of compression molding exercises the effect of mass production on molded articles of a comparatively simple form such as flat plates and yields almost no loss of materials, which is excellently economical. On molding, a requisite proportion of the resin-exposed surface area can be achieved.

In the invention, the surfaces of molded articles can undergo a treatment after molding so as to achieve the requisite proportion in resin-exposed surface area.

For this purpose, selective removal of a resin component can be adopted. For example, it is effective that after releasing from dies, high-pressure water is sprayed on the surfaces of the molded articles to carry out a surface treatment.

Conditions of this treatment are not limited because the conditions vary depending upon thickness, a distance from a nozzle, or forms to be treated. However, to an article having a thickness of 1 to 20 cm, water pressure of about 100 to about 1500 kg/cm$^2$ is usually applied through a nozzle from height of 2 to 20 mm.

The nozzle for spraying the high-pressure water and the system are not particularly limited. A variety of nozzles and systems can be adopted.

Application of this surface treatment by a water jet realizes the formation of rough surfaces and artificial stones having the non-slip properties and a sense of depth and high quality are prepared.

The disposal of waste liquor is easily carried out as compared with the etching process where chemicals are used.

As a matter of course, it also is possible that the surfaces of artificial stones are treated with organic solvents as needed and the resin component is softened or dissolved to partially remove.

In this case, organic solvents can be selected depending upon resin components used. Examples thereof include halogenated hydrocarbons such as ethylene chloride, methylene chloride, and chloroform; carboxylic acids and the esters thereof such as acetic anhydride, ethyl acetate, and butyl acetate; and acetone, tetrahydrofuran, DMF, and DMSO.

The resin component is softened or dissolved by dipping molded articles in these organic solvents or by spraying or streaming down the organic solvents to remove the resin component from the surfaces, which produces unevenness on the surfaces.

Or it also is effective to scratch off a resin component of low hardness out of the surfaces with wire brushes or by cutting means.

It also is effective that a covering layer containing the small particle component is partially broken by polishing the surface thereof before carrying out the formation of rough surface and the surface treatment by various means as described above so that the covering layer and the particles of the small particle component are exposed on the surface of the article as sections, which brings about a sense of high quality having unique depth, gloss, and luster to the surface. This phenomenon depends upon reflection unique to light.

In the invention, the formation of rough surfaces after polish is particularly effectively carried out by the water jet. In the artificial stones of the invention where the inorganic particle component is uniformly dispersed, resin is peeled off in minute slice form in the formation of rough surfaces after polish and the non-slip artificial stones of the invention come to be more effectively produced.

The means for polishing the surfaces are not particularly limited. The polish of the surfaces is carried out by use of tools such as whetstones, abrasive cloths and abrasive belts or by use of abrasive agents such as buff abrasive substances and rubbing compounds.

Abrasive materials used suitably include diamond having abrasive action, boron carbide, corundum, alumina, zirconia, tripoli having abrasive action, dolomite, chromium oxide, and cerium oxide.

Rough surfaces can be formed after carrying out such polish.

EXAMPLES

Examples as illustrated below. This invention is not to be limited by the following examples.

Example 1

Natural silica having particle sizes of 10 to 25 meshes as the small particle component and alumina hydroxide having an average particle size of 230 meshes as the fine particle component in a weight ratio of 3:1 which comprised 89.4 weight percent of the total weight of the composition, 10.5 weight percent of poly(methyl methacrylate) syrup and 0.1 weight percent of a curing agent were uniformly mixed to take the form of mortar.

This composition was placed in a frame and molded into tabular articles of about 10-mm thickness.

Subsequently, the surface of the article was polished by use of a corundum abrasive material, which permitted exposure of partial sections of the small particle component.

Furthermore, a water jet of 1500-kg/cm$^2$ pressure was sprayed onto the surface through a nozzle from a distance of 5 mm to carry out a treatment for forming a rough surface. In the artificial stone thus treated, the proportion of a resin-exposed plane area to a unit surface area of 50 mm in length×50 mm in width was found to be 26 percent and the average surface roughness was found to be 0.8 mm.

The resulting artificial stone has depth, a marble-like milky color and gloss, no bubbles in the inner part and on the surface, and a uniform composition. About plates equipped with a function of disaster prevention for guiding visually handicapped persons, a performance test, namely, a slip resistance test was carried out according to a method of ASTE E 303 (Standard Method for Measuring Surface Frictional Properties Using the British Pendulum Tester). The slip resistance values B.P.N. were 91 at a dry condition and 59 at a wet condition on the average of six tested articles.

These results show that the artificial stone has good non-slip properties.

The specific gravity was 2.29 as a result of the test according to the Japanese Industrial Standards JIS K-7112. The water absorption was 0.13 percent. The characteristic properties of the artificial stone were 1390 kg/cm$^2$ in compression strength and 1031 kgf/mm$^2$ in hardness.

Furthermore, in both the test of resistance to acids where the artificial stones were dipped in 3% hydrochloric acid for 8 hours and the test of resistance to alkalis where the stones were dipped in 3% aqueous solution of sodium hydroxide, anything unusual was not observed.

Example 2

An artificial stone was prepared similarly to Example 1 except that the sum of the small particle component and the fine particle component was 87 percent and the resin component was 12 percent.

Similarly to Example 1, a high-quality artificial stone was obtained, which has a marble-like, excellent deep surface. The proportion of a resin-exposed surface area was 30 percent, the average surface roughness was 1 mm, and the slip resistance values B.P.N. were 90 at a dry condition and 58 at a wet condition. Thus, good non-slip properties were obtained.

As described above, the invention provides high-density non-slip artificial stones having deep, glossy, excellent color tones, and good characteristics, which the conventional artificial stones have not been achieved.

What is claimed is:

1. A non-slip artificial stone comprising an inorganic particle component which comprises 82 to 93 weight percent and a resin component which comprises 7 to 18 weight percent based on the total amount of the stone, wherein the proportion of resin-exposed surface area in a unit surface area of 50 mm in length×50 mm in width is from 15 percent or more to 40 percent or less, and wherein the stone does not contain a fiber filler component.

2. The non-slip artificial stone of claim 1, wherein the inorganic particle component comprises a small particle component having sizes of 5 to 70 meshes and a fine particle component having sizes of less than 100 meshes.

3. The non-slip artificial stone of claim 1, wherein the proportion of the resin-exposed surface area is from 20 to 35 percent.

4. The non-slip artificial stone of claim 1, wherein the average surface roughness is from 0.05 to 2 mm.

5. A process for preparing the non-slip artificial stone of claim 1, which comprises molding the inorganic particle component and the resin component to obtain an artificial stone, and then roughening the surface of the artificial stone by means of a water jet to provide the proportion of resin-exposed surface area, to thereby prepare the non-slip artificial stone.

6. The process of claim 5, wherein the surface of the artificial stone is subjected to the mirror polishing before the roughening step by the water jet.

7. The non-slip artificial stone of claim 2 wherein the proportion of the resin-exposed surface area is from 20 to 35 percent.

8. The non-slip artificial stone of claim 2 wherein the average surface roughness is from 0.05 to 2 mm.

9. The non-slip artificial stone of claim 3 wherein the average surface roughness is from 0.05 to 2 mm.

10. The process for preparing the non-slip artificial stone of claim 2, which comprises molding the inorganic particle component and the resin component to obtain an artificial stone, and then roughening the surface of the artificial stone by means of a water jet to provide the proportion of resin-exposed surface area, to thereby prepare the non-slip artificial stone.

11. The process for preparing the non-slip artificial stone of claim 3, which comprises molding the inorganic particle component and the resin component to obtain an artificial stone, and then roughening the surface of the artificial stone by means of a water jet to provide the proportion of resin-exposed surface area, to thereby prepare the non-slip artificial stone.

12. The process for preparing the non-slip artificial stone of claim 4, which comprises molding the inorganic particle component and the resin component to obtain an artificial stone, and then roughening the surface of the artificial stone by means of a water jet to provide the proportion of resin-exposed surface area, to thereby prepare the non-slip artificial stone.

13. The process of claim 10, wherein the surface of the artificial stone is subjected to the mirror polishing before the roughening step by the water jet.

14. The process of claim 11, wherein the surface of the artificial stone is subjected to the mirror polishing before the roughening step by the water jet.

15. The process of claim 12, wherein the surface of the artificial stone is subjected to the mirror polishing before the roughening step by the water jet.

* * * * *